Oct. 11, 1960     E. J. GOEPPINGER ET AL     2,956,251
PRESSURE RESPONSIVE INSTRUMENT
Filed Dec. 30, 1952

INVENTORS.
EDWARD J. GOEPPINGER
MARLAN E. BOURNS
BY MARVIN E. HARRISON

Herbert E. Kidder
AGENT

United States Patent Office 2,956,251
Patented Oct. 11, 1960

2,956,251
PRESSURE RESPONSIVE INSTRUMENT

Edward J. Goeppinger, Marlan E. Bourns, 2482 Carlton Place, and Marvin E. Harrison, all of Riverside, Calif.; said Goeppinger and said Harrison assignors to said Bourns Filed Dec. 30, 1952, Ser. No. 328,708

12 Claims. (Cl. 338—40)

The present invention relates generally to electrical instruments, and more particularly, to pressure responsive resistors or potentiometers of the type used in precision telemetering operation on air-borne vehicles.

In the testing of new aircraft or guided missiles, it is necessary to have a continuous and highly accurate record of pressure conditions at various stations on the vehicle, and this information is obtained by translating pressure variations into proportional variations of an electrical quantity, which is transmitted by radio communication to recording instruments on the ground. The translation of pressure conditions to electrical values is accomplished by means of a pressure-responsive chamber, such as a Bourdon tube, which is linked to a variable resistor.

The primary object of the present invention is to provide a new and improved pressure responsive instrument of the class described, which is compact, light in weight, extremely accurate in response, and simple in construction.

Another object is to provide an instrument of the class described, wherein means is provided on the movable contact arm for counterbalancing the mass system of the Bourdon tube and contact arm to minimize the effect of acceleration and vibration forces on the arm.

Another object of the invention is to provide a one-piece contact arm of extremely simple construction and small moment of inertia, as well as one which is rigid and unbending for a portion of its length, yet flexible and resilient for the balance of its length. In this same connection, it is a further object of the invention to provide an arm having marginal edges turned up to form a dovetail channel, so that a connector or other part such as the aforementioned counterbalance may be dovetailed into the channel. This arrangement enables the parts to be shifted in position along the length of the arm, and permits the moment arm to be adjusted to suit the characteristics of the Bourdon tube or other actuating member. In like manner, the counterbalance may be shifted to adjust the balance of the mass-system.

Another object is to provide an instrument of the class described, wherein the free end of the Bourdon tube or other actuating member is connected to the contact arm by a flexible strap or other member which bends freely to accommodate itself to the relative positions of the two points of attachment with respect to one another. This flexible member replaces the link that has heretofore been used; said link having pivot connections at both ends. The advantage of the flexible member is that it eliminates the back-lash or lost motion that is unavoidably present in any pivoted link connection, and also eliminates the need for lubrication with its attendant difficulties at extremely low temperatures.

Still a further object of the invention is to provide an instrument of the class described having a pivoted contact arm and a spiral return spring connected at one end thereto, wherein the other end of the spring is anchored within a slot in the end of a terminal embedded in the case. Such an arrangement is simple to assemble and disassemble, and provides an anchorage which does not distort the spring or otherwise affect its characteristics.

These and other objects and advantages of the invention will become apparent to those skilled in the art upon consideration of the following detailed description of the preferred embodiment thereof, reference being had to the accompanying drawing, wherein.

Figure 1:
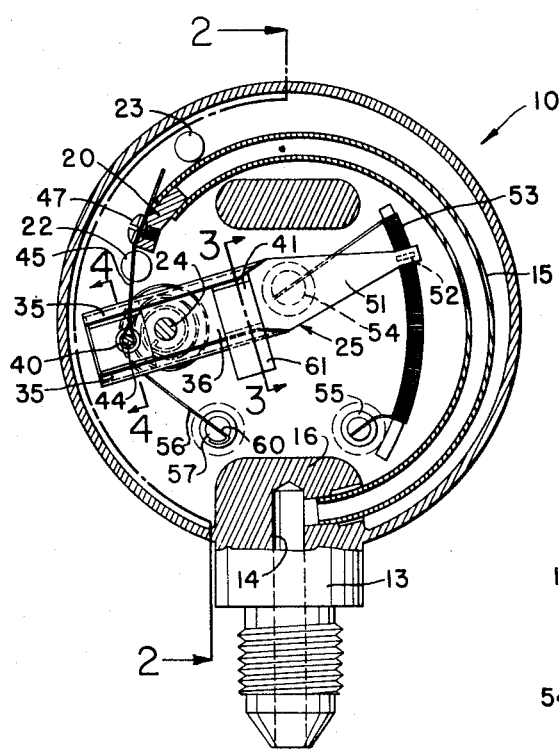
Figure 1 is a sectional view through a pressure responsive instrument embodying the principles of our invention, taken along the line 1—1 in Figure 2.
Figure 3:
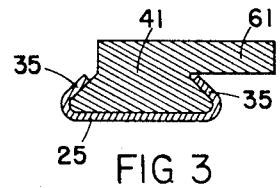
Figure 3 is an enlarged transverse section through the counterweight, taken at 3—3 in Figure 1.
Figure 4:
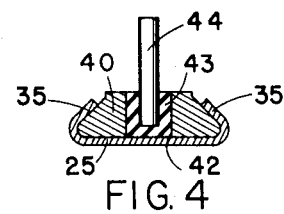
Figure 4 is an enlarged transverse section through the connector part, taken at 4—4 in Figure 1.
Figure 2:
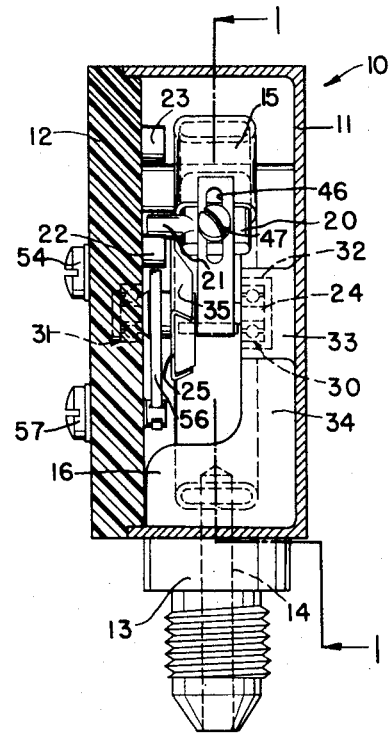
Figure 2 is a sectional side view of the same, taken at 2—2 in Figure 1.
Figure 5:
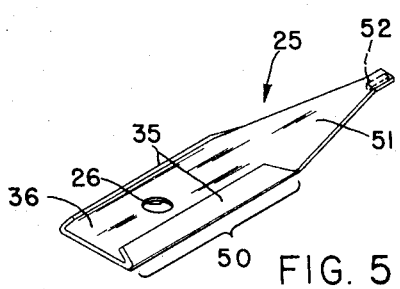
Figure 5 is a perspective view of the contact arm by itself.

In the drawings, the invention is embodied in a pressure responsive instrument of the variable resistor type, although certain aspects of the invention are applicable to other instruments such as thermostats, hygrometers, and the like.

The reference numeral 10 designates the instrument case, which comprises a cup-shaped body 11 and cover 12. The body 11 is preferably made of aluminum alloy or other lightweight metal, while the cover 12 is conveniently molded of phenolic resin or other plastic. Formed integral with the body is a stem 13 having a central bore 14 which communicates with the interior of a Bourdon tube 15 at one end thereof. The Bourdon tube is a flattened, thin-walled tube that is bent into a circular arc, and one end is attached to a boss 16 forming an extension of the stem 13 projecting into the cavity of the body 11.

The free end of the Bourdon tube is closed by a metal plug 20, which is shaped to conform to the interior of the tube and is soldered therein. The plug 20 also has a downwardly extending leg 21 which is engageable by two limit stops 22 and 23 projecting from the cover 12. The stops 22, 23 limit the travel of the free end of the Bourdon tube, and prevent it from deflecting to the extent of exceeding the elastic limit of the metal walls.

Pivotally mounted within the case 10 on a shaft 24 is a contact arm 25. The shaft 24 extends through a hole 26 in the arm adjacent one end thereof, and is soldered or otherwise rigidly attached thereto. The ends of the shaft 24 are received within ball bearings 30 and 31, which are inserted into circular cavities in the body 11 and cover 12, respectively. The cover 12 is of dielectric material, and the bearing 31 is therefore seated directly in its cavity. The body 11, being of metal, is conductive, and the bearing 30 is insulated therefrom by a plastic cup 32. The plastic cup 32 and bearing 30 are contained within a cavity in a central boss 33, which is connected by a rib 34 to the boss 16.

The arm 25 is formed of thin, electrically conductive sheet metal, such as beryllium copper, and the marginal edges are bent up from the midsection for a portion of the arm's length to form parallel sides 35. The sides 35 are inclined inwardly toward one another, forming a dovetail channel 36 which receives a connector part 40 and dynamic mass balance 41.

Both the connector part 40 and dynamic mass balance 41 are wedge-shaped members having sloping sides which dovetail into the channel 36. The sides 35 of the dovetail channel are bent inwardly to a slightly smaller angle than the included angle between the sides and bottom of the members 40, 41. This causes the members 40, 41 to be gripped with resilient spring tension, so that they are held in adjusted position along the length of the arm. When the instrument has been properly adjusted and calibrated, the members 40, 41 may be permanently fixed in position by soldering or otherwise joining them to the arm.

A hole 42 extends through the part 40 from top to bottom, and seated therein is an insulating cup 43 of plastic or glass, which receives an upwardly projecting pin 44. The pin 44 is connected to the free end of the Bourdon tube 15 by means of a thin flexible strap 45, or other flexible member such as a wire, capable of bending with little resistance to accommodate itself to the relative positions of the pin and tube end throughout the range of the instrument. As mentioned earlier, the flexible strap 45 replaces the pivoted link that has heretofore been used to connect the Bourdon tube to contact arm, and the advantages are that lost motion and friction are eliminated, and no lubrication is required.

The strap 45 is wrapped around the pin 44, and may either be soldered thereto or allowed to turn freely. The other end of the strap is slotted at 46, and a screw 47 is passed through the slot and threaded into a tapped hole in the plug 20. The slot 46 permits adjustment in the length of the strap 45, when necessary.

Returning to the contact arm 25, it will be noted that the upwardly bent edges 35 extend from one end of the arm to a point intermediate the pivot hole 26 and the other end of the arm. These upwardly bent edges stiffen that portion of the arm, providing a relatively stiff, unbending section 50. The remaining length of the arm is flat from side to side, providing a locally resilient section 51 which functions in the manner of a leaf spring. The stiff, unbending section 50 of the arm causes all bending deflection to be confined to the flat section 51, and the shortened spring leaf is considerably stiffer than would be the case if deflection took place over the full length of the arm.

At the outer end of the arm 25 is a contact tip 52 which bears on and slidably engages a resistance element 53. The element 53 consists of a coil of fine resistance wire wound on an arcuate core, the center of which is at the center of pivot shaft 24. One end of the wire is connected to a terminal 54, while the other end is connected to a second terminal 55.

Voltage picked up by the contact tip 52 is transmitted back through the arm 25 and shaft 24 to a return spring 56, which is connected to a third terminal 57. The spring 56 is a spiral torsion spring, the inner end of which is hooked into the shaft 24. The outer end of the spring is received within a diametric slot 60 in the end of the terminal 57, and is bent around the outer surface of the terminal and soldered thereto. The spring exerts a torsional pull on the shaft 24, tending to swing the arm 25 in a counter clockwise direction. Since the Bourdon tube exerts a pull on the strap 45 tending to swing the arm in a clockwise direction, the spring 56 opposes the Bourdon tube, and maintains tension on the strap 45.

The dynamic mass balance member 41 has the function of dynamically balancing the entire system consisting of the free end of Bourdon tube 15, plug 20, strap 45, arm 25, and part 40. Accordingly, the dynamic mass balance 41 is shifted along the length of the dovetail channel 36 until the point is reached where the system is approximately in equilibrium about the pivot center for acceleration in two directions. At this point, the combined mass times moment arm of the member 41 and right-hand side of the arm 25 is substantially equal to the combined mass times moment arm of the free end of the Bourdon tube 15, plug 20, strap 45, part 40, and left-hand end of the arm 25. The inertial force of the movable end of the Bourdon tube and attached members is therefore opposed by the substantially equal inertial force of the member 41, with the result that the movable end of the Bourdon tube is restrained against movement due to acceleration or vibration. In order to achieve this condition of equilibrium, the dynamic mass balance 41 is extended above the sides 35 of the arm and provided with a laterally projecting portion 61 overhanging one of the sides 35. This overhanging portion places the center of gravity of the member 41 to one side of the longitudinal center line of the arm, which is necessary to balance the free end of the Bourbon tube. The condition of balance holds true for only one position of the arm, and balance will therefore usually be figured for the approximate arm position anticipated in actual service.

While we have shown and described our invention as embodied in a Bourdon-tube-actuated pressure responsive instrument, it is to be understood that certain aspects of the invention are not in any way limited to such instruments. For example, the one-piece contact arm of sheet metal with its upturned sides forming a stiff portion and a flat, locally resilient portion might be used advantageously in any radial potentiometer or switch, while the adjustable connector part 40 and dynamic mass balance 41, or the flexible connecting member 45, might likewise find utility in other instruments. In view of these alternative uses of the invention, the term "electrical element" as used in the claims, will be understood to mean either a resistance element or a conductor element. Other changes will occur to those skilled in the art, which will still come within the broad scope of the appended claims.

We claim:

1. An adjustable resistor comprising a body member and a cover member cooperating therewith, one of said members being formed of metal and the other being formed of dielectric material, a rotatable shaft having one end journaled in said body member and the other end journaled in said cover member, a metal contact arm attached to said shaft, an electrical element mounted on said other member and slidably contacted by said arm, a terminal electrically connected to said arm, and dielectric means insulating said shaft from said one member of metal.

2. In an electrical instrument having a resistance element, a contact arm of thin sheet metal having a tip at one end slidably engaging said resistance element, the marginal edges of said arm for a portion of the length thereof being bent up from the midsection to form parallel converging sides, said bent sides serving to stiffen said portion of the arm length to provide a relatively stiff, unbending section, the remaining length of said arms being shaped to provide a locally resilient section which can be deflected to exert a yielding spring pressure of said contact tip on said resistance element, and a part having inclined sides which are dovetailed into said converging sides of said contact arm.

3. In an electrical instrument having a resistance element, a pivoted contact arm having a tip at one end slidably engaging said resistance element, said arm being formed of thin sheet metal and having the marginal edges bent out from the midsection for a portion of the length thereof to form a dovetail channel, said outwardly bent marginal edges serving to stiffen said portion of the arm length to provide a relatively unbending section, the remaining length of said arm being substantially flat from side to side, so as to provide a locally resilient section having the function of a spring leaf, a part having sloping sides received within said dovetail channel, a movable actuating member, and an operating connection between said member and said part, whereby movement of said actuating member causes said arm to swing on its pivot, said part being shiftable along said dovetail channel to adjust the length of moment arm from the pivot center to the point of application of force by said operating connection, and said outwardly bent marginal edges gripping said part with spring tension so as to hold said part in adjusted position along the length of said arm.

4. In an electrical instrument having a resistance element, a contact arm pivoted intermediate its ends and having a tip at one end slidably engaging said resistance element, said arm being formed of thin sheet metal and having the marginal edges bent out from the midsection for a portion of the length thereof extending from the other end of the arm to a point intermediate the pivot center and said one end, said outwardly bent marginal edges forming a dovetail channel which serves to stiffen said portion of the arm to provide a relatively stiff, unbending section, the remaining length of said arm being substantially flat from side to side, so as to provide a locally resilient section having the function of a spring leaf, a part having sloping sides dovetailed into said channel between said pivot center and said other end of said arm, and a movable actuating member connected to said part, said part being shiftable along said dovetail channel to adjust the length of moment arm from the pivot center to the point of application of force by said actuating member.

5. In an electrical instrument, a pivoted arm of sheet metal having the marginal edges thereof bent up from the midsection for a portion of the length thereof to form a longitudinally extending dovetail channel, a sensing element having a movable portion attached to said arm, and a counterbalance dovetailed into said channel and adjustable along the length thereof, said counterbalance extending above the sides of said channel and projecting laterally to one side of said arm, the center of mass of said counterbalance being offset laterally from the longitudinal centerline of said arm a distance such that for one position of the arm, the arm and attached movable portion of said sensing element are mass-balanced about its pivot center for accelerations in two directions.

6. In an electrical instrument having a resistance element, a contact arm pivoted intermediate its ends and having a tip at one end slidably engaging said resistance element, said arm being formed of thin sheet metal and having the marginal edges bent out from the midsection for a portion of the length thereof extending from the other end of the arm to a point intermediate the pivot center and said one end, said outwardly bent marginal edges forming a dovetail channel which serves to stiffen said portion of the arm to provide a relatively stiff, unbending section, the remaining length of said arm being substantially flat from side to side, so as to provide a locally resilient section having the function of a spring leaf, a part having sloping sides dovetailed into said channel between said pivot center and said other end of said arm, a movable actuating member connected to said part, said part being shiftable along said dovetail channel to adjust the length of moment arm from the pivot center to the point of application of force by said actuating member, a counterbalance dovetailed into said channel on the side of said pivot opposite said part, said counterbalance being adjustable along the length of said channel and projecting laterally to one side of the longitudinal centerline of the arm, whereby the center of mass of the counterbalance can be located so that for one position of the arm, the arm and connected actuating member are mass-balanced about the pivot center for accelerations in two directions.

7. A pressure responsive instrument comprising a case, a Bourdon tube having one end fixedly attached to said case, the free end of said Bourdon tube being movable in response to pressure changes, a resistance element mounted on said case, a contact arm pivoted on said case and having a tip at one end slidably engaging said resistance element, said arm being formed of thin electrically conductive sheet metal and having the marginal edges bent out from the midsection for a portion of the length thereof to form a dovetail channel, said outwardly bent marginal edges serving to stiffen said portion of the arm length to provide a relatively stiff, unbending section, the remaining length of said arm being substantially flat from side to side, so as to provide a locally resilient section having the function of a spring leaf, a part having sloping sides dovetailed into said channel, a pin mounted on said part and electrically insulated therefrom, and a connection between said free end of said Bourdon tube and said pin, whereby movement of said tube causes said arm to swing on its pivot, said insulated pin preventing current from being transmitted from said arm to said Bourdon tube.

8. A pressure responsive instrument comprising a case having an electrical element mounted thereon, a contact arm pivoted on said case and having a tip at one end slidably engaging said resistance element, a Bourdon tube attached at one end to said case, means connecting the free end of said Bourdon tube to said contact arm, whereby the latter is swung on its pivot by movement of the Bourdon tube, and a counterbalance attached to said arm with its mass center located at the position wherein the system comprising said arm and attached Bourdon tube is mass-balanced about the pivot center for at least one position of said arm, to minimize the effect of acceleration.

9. A pressure responsive instrument comprising a case, a Bourdon tube having one end fixedly attached to said case, the free end of said Bourdon tube being movable in response to pressure changes, a resistance element mounted on said case, a contact arm pivoted intermediate its ends on said case and having a tip at one end slidably engaging said resistance element, said arm being formed of thin electrically conductive sheet metal and having the marginal edges bent out from the midsection for a portion of the length thereof extending from the other end of the arm to a point intermediate the pivot center and said one end, said outwardly bent marginal edges forming a dovetail channel which serves to stiffen said portion of the arm to provide a relatively stiff, unbending section, the remaining length of said arm being substantially flat from side to side, so as to provide a locally resilient section having the function of a spring leaf, a part having sloping sides dovetailed into said channel, between said pivot center and said other end of said arm, a thin flexible strap connecting the free end of said Bourdon tube to said part, said part being shiftable along said dovetail channel to adjust the length of moment arm from the pivot center to the point of application of force by said strap, and a counterbalance dovetailed into said channel on the side of said pivot opposite said part, said counterbalance being adjustable along the length of said channel to position its mass center so that the system comprising said arm and attached Bourdon tube is substantially mass-balanced about the pivot center for at least one position of said arm, so as to minimize the effect of accelerations.

10. An instrument of the class described comprising a case, a sensing element having one end fixedly attached to said case and the other end thereof being movable, an arm pivoted on said case intermediate its ends, means connecting said other end of said sensing element to said arm on one side of the pivot center, whereby movement of said other end of said element causes said arm to turn on its pivot, and a dynamic mass balance mounted on said arm on the other side of the pivot center, the mass times moment arm of said mass member being substantially equal to the combined mass times moment arm of the free end of said sensing element and said connecting means.

11. An instrument of the class described comprising a case, a sensing element having one end fixedly attached to said case and the other end thereof being movable, an arm pivoted on said case and connected to said other end of said sensing element, whereby movement of said other end of said element causes said arm to turn on its pivot, said arm having bent-up edges for a portion of its length, and a counterweight slidably mounted on said arm and cooperating with said bent-up edges for attachment to said arm, said counterweight being adjustable along the length of said arm and projecting laterally to one side of the longitudinal center-line of the arm, whereby the center of mass of the counterweight is positioned to mass-balance the arm and connected movable portion of said sensing element about the pivot center for accelerations in two directions.

12. An instrument comprising a case, a sensing element having one end fixedly attached to said case, and the other end movable, a resistance element mounted on said case, a contact arm pivoted on said case and having a tip at one end slidably engaging said resistance element, said arm being formed of thin sheet metal and having the marginal edges thereof bent up to form a channel section extending from the pivot to a point adjacent said tip, said channel providing a stiff, relatively unyielding portion of arm length, the remaining length of said arm being shaped to provide a locally resilient portion adjacent said contact tip serving to hold the tip yieldingly against said resistance element, a part fitting into the channel portion of said arm, an insulated connector mounted on said part, and link means between said free end of said sensing element and said connector, whereby movement of said sensing element causes said arm to swing on its pivot, said insulated connector preventing current from flowing between said arm and said sensing element.

References Cited in the file of this patent

UNITED STATES PATENTS

| | | |
|---|---|---|
| 661,127 | LaRoche | Nov. 6, 1900 |
| 866,387 | Richard | Sept. 17, 1907 |
| 958,792 | Zander | May 24, 1910 |
| 2,152,262 | Klein et al. | Mar. 28, 1939 |
| 2,226,629 | Mather | Dec. 31, 1940 |
| 2,255,003 | Radanet | Sept. 2, 1941 |
| 2,525,095 | Coxon et al. | Oct. 10, 1950 |
| 2,622,177 | Klose | Dec. 16, 1952 |

FOREIGN PATENTS

| | | |
|---|---|---|
| 199,632 | Great Britain | June 28, 1928 |
| 483,450 | Great Britain | Apr. 20, 1938 |